(12) United States Patent
Schmitt et al.

(10) Patent No.: US 10,731,486 B2
(45) Date of Patent: Aug. 4, 2020

(54) DUCT ASSEMBLY AND METHOD OF FORMING

(71) Applicant: Unison Industries, LLC, Jacksonville, FL (US)

(72) Inventors: Joseph Richard Schmitt, Springfield, OH (US); Emily Marie Phelps, Bellbrook, OH (US); Gordon Tajiri, Waynesville, OH (US)

(73) Assignee: Unison Industries, LLC, Jacksonville, FL (US)

( * ) Notice: Subject to any disclaimer, the term of this patent is extended or adjusted under 35 U.S.C. 154(b) by 65 days.

(21) Appl. No.: 15/940,119

(22) Filed: Mar. 29, 2018

(65) Prior Publication Data

US 2019/0301293 A1 Oct. 3, 2019

(51) Int. Cl.
| | |
|---|---|
| *F02C 6/08* | (2006.01) |
| *F02C 7/18* | (2006.01) |
| *F02C 9/52* | (2006.01) |
| *F02C 9/18* | (2006.01) |
| *F01D 9/02* | (2006.01) |
| *F23R 3/42* | (2006.01) |
| *F02K 3/075* | (2006.01) |

(52) U.S. Cl.
CPC ............ *F01D 9/023* (2013.01); *F02C 6/08* (2013.01); *F02C 7/18* (2013.01); *F02C 9/18* (2013.01); *F02C 9/52* (2013.01); *F23R 3/42* (2013.01); *F02K 3/075* (2013.01); *F05D 2210/30* (2013.01); *F05D 2240/12* (2013.01); *F05D 2250/75* (2013.01)

(58) Field of Classification Search
CPC .... F01D 9/023; F02C 6/08; F02C 7/18; F02C 9/18; F02K 3/075; F05D 2210/30; F05D 2240/12; F05D 2250/75; F23R 3/42
See application file for complete search history.

(56) References Cited

U.S. PATENT DOCUMENTS

| | | | |
|---|---|---|---|
| 314,528 | A | 3/1885 | Hardy |
| 315,628 | A | 4/1885 | Jacobsen |
| 315,681 | A | 4/1885 | Von Hollen |
| 316,569 | A | 4/1885 | Reynolds |
| 317,921 | A | 5/1885 | Brown |
| 318,604 | A | 5/1885 | Devereux |
| 320,600 | A | 6/1885 | Stoetzel |
| 691,803 | A | 1/1902 | Patton |
| 1,282,269 | A | 10/1918 | Merritt |

(Continued)

FOREIGN PATENT DOCUMENTS

| | | | |
|---|---|---|---|
| EP | 1336810 A2 | 8/2003 | |
| FR | 2331690 A1 * | 6/1977 | ............... C25D 1/02 |

(Continued)

OTHER PUBLICATIONS

Messerschmitt Boelkow Blohm; FR-2331690; Lightweight Fixing Strap for Rocket Combustion; Oct. 26, 2019; pp. 1-2.*

*Primary Examiner* — Bayan Salone
(74) *Attorney, Agent, or Firm* — McGarry Bair PC (57) ABSTRACT

A method of forming a strengthened component includes providing a duct body having an interior surface and an exterior surface forming a fluid passageway. The method also includes forming an attachment structure over at least a portion of the exterior surface of the duct body, where the attachment structure can include a metallic layer.

15 Claims, 8 Drawing Sheets

(56) References Cited

U.S. PATENT DOCUMENTS

| | | | |
|---|---|---|---|
| 1,694,962 A | 12/1928 | Berry | |
| 2,181,257 A | 11/1939 | Arbogast | |
| 2,287,122 A | 6/1942 | Norris | |
| 2,761,828 A | 9/1956 | Ginzton | |
| 3,022,230 A | 2/1962 | Fialkoff | |
| 3,308,879 A | 3/1967 | Maddocks | |
| 3,554,874 A * | 1/1971 | Mattia | C25D 1/02 |
| | | | 205/73 |
| 3,910,039 A | 10/1975 | Fortini | |
| 4,156,306 A | 5/1979 | Seidel | |
| 4,214,945 A | 7/1980 | Lucas | |
| 4,255,237 A | 3/1981 | Siegfried | |
| 4,417,854 A | 11/1983 | Cain | |
| 4,664,758 A * | 5/1987 | Grey | C25D 1/00 |
| | | | 205/73 |
| 5,293,922 A | 3/1994 | Sayama Masami | |
| 5,698,086 A | 12/1997 | Herbert | |
| 6,582,542 B1 * | 6/2003 | Russell | B23P 15/008 |
| | | | 156/156 |
| 6,904,756 B2 | 6/2005 | Mack | |
| 7,113,684 B1 * | 9/2006 | Cianciotto | G02B 6/0096 |
| | | | 362/551 |
| 7,171,097 B2 * | 1/2007 | Cianciotto | G02B 6/0096 |
| | | | 385/133 |
| 7,712,789 B2 | 5/2010 | Heuer | |
| 8,636,485 B2 | 1/2014 | Steele | |
| 9,284,654 B2 * | 3/2016 | Saucy | B81C 99/0085 |
| 9,365,941 B2 * | 6/2016 | Saucy | B81C 99/0085 |
| 9,624,779 B2 | 4/2017 | Yan | |
| 2006/0285815 A1 * | 12/2006 | Cianciotto | G02B 6/0096 |
| | | | 385/146 |
| 2011/0062112 A1 * | 3/2011 | Saucy | B81C 99/0085 |
| | | | 216/52 |
| 2014/0202170 A1 * | 7/2014 | Cook, III | F02C 7/04 |
| | | | 60/805 |
| 2015/0096631 A1 | 4/2015 | Regan | |
| 2016/0003257 A1 | 1/2016 | Bianchi | |
| 2016/0281532 A1 | 9/2016 | Rambo | |
| 2016/0312614 A1 | 10/2016 | Kinstler | |
| 2017/0291214 A1 | 10/2017 | Roberge | |
| 2018/0312987 A1 * | 11/2018 | Jonnalagadda | C25D 1/02 |
| 2018/0320801 A1 * | 11/2018 | Yang | B23P 15/00 |

FOREIGN PATENT DOCUMENTS

| | | | |
|---|---|---|---|
| FR | 2331690 A1 | 6/1977 | |
| GB | 2194552 A1 | 3/1988 | |

* cited by examiner

DUCT ASSEMBLY AND METHOD OF FORMING

BACKGROUND

Turbine engines, and particularly gas or combustion turbine engines, are rotary engines that extract energy from a flow of combusted gases passing through the engine in a series of compressor stages, which include pairs of rotating blades and stationary vanes, through a combustor, and then onto a multitude of turbine stages, also including multiple pairs of rotating blades and stationary vanes.

Duct assemblies are generally provided about the turbine engine and include conduits for providing the flow of various operating fluids to and from the turbine engine and between stages of the turbine engine. For example, bleed air turbine engine can be utilized in various ways, including providing pressure for the aircraft cabin, or keeping components of the aircraft free of ice.

BRIEF DESCRIPTION

In one aspect, the disclosure relates to a method of forming a strengthened component. The method includes providing a duct body having an exterior surface and an interior surface forming a fluid passageway, disposing a sacrificial mold onto the duct body, forming an attachment structure by way of electroforming a metallic layer over the exposed mold outer surface and at least a portion of the exterior surface of the duct body, and removing the sacrificial material.

In another aspect, the disclosure relates to a duct assembly. The duct assembly includes a duct body having a length with an exterior surface and an interior surface defining a fluid passageway along the length; and an attachment structure unitarily formed with the exterior surface of the duct body.

DESCRIPTION OF EMBODIMENTS

Aspects of present disclosure relate to a duct assembly or conduit for providing a flow of fluid including from one portion of an aircraft engine to another. The duct can include an integrally-formed or unitarily-formed attachment structure which can be utilized to couple the duct assembly to a portion of the aircraft engine or surrounding structures thereof. For purposes of illustration, the present invention will be described with respect to a gas turbine engine. Gas turbine engines have been used for land and nautical locomotion and power generation, but are most commonly used for aeronautical applications such as for airplanes, including helicopters. In airplanes, gas turbine engines are used for propulsion of the aircraft. It will be understood, however, that the invention is not so limited and can have general applicability in non-aircraft applications, such as other mobile applications and non-mobile industrial, commercial, and residential applications.

As used herein "a set" can include any number of the respectively described elements, including only one element. Additionally, all directional references (e.g., radial, axial, proximal, distal, upper, lower, upward, downward, left, right, lateral, front, back, top, bottom, above, below, vertical, horizontal, clockwise, counterclockwise, upstream, downstream, aft, etc.) are only used for identification purposes to aid the reader's understanding of the present disclosure, and do not create limitations, particularly as to the position, orientation, or use of the present disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

All directional references (e.g., radial, axial, proximal, distal, upper, lower, upward, downward, left, right, lateral, front, back, top, bottom, above, below, vertical, horizontal, clockwise, counterclockwise, upstream, downstream, aft, etc.) are only used for identification purposes to aid the reader's understanding of the present invention, and do not create limitations, particularly as to the position, orientation, or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. In addition, as used herein, being "flush" with a given surface will refer to being level with, or tangential to, that surface. The exemplary drawings are for purposes of illustration only and the dimensions, positions, order and relative sizes reflected in the drawings attached hereto can vary.

Figure 1:
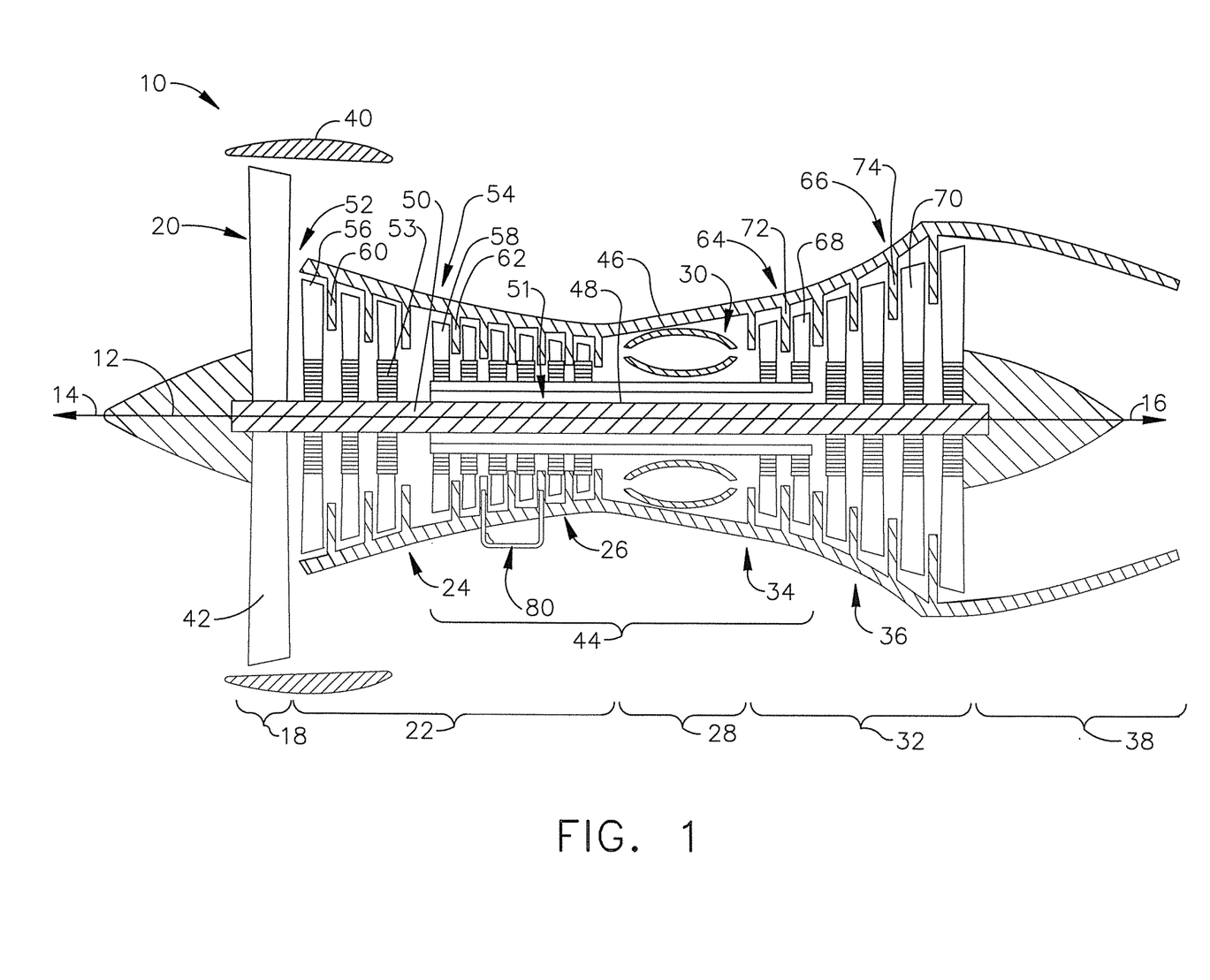
FIG. 1 is a schematic cross-sectional view of a gas turbine engine with a duct assembly in accordance with various aspects described herein.

FIG. 1 is a schematic cross-sectional diagram of a gas turbine engine 10 for an aircraft. The engine 10 has a generally longitudinally extending axis or centerline 12 extending from forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a set of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The portions of the engine 10 mounted to and rotating with either or both of the spools 48, 50 are also referred to individually or collectively as a rotor 51.

The LP compressor 24 and the HP compressor 26 respectively include a set of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible. The blades 56, 58 for a stage of the compressor can be mounted to a disk 53, which is mounted to the corresponding one of the HP and LP spools 48, 50, respectively, with stages having their own disks. The vanes 60, 62 are mounted to the core casing 46 in a circumferential arrangement about the rotor 51.

The HP turbine 34 and the LP turbine 36 respectively include a set of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

Some of the air from the compressor section 22 can be bled off via one or more duct assemblies 80, and be used for cooling of portions, especially hot portions, such as the HP turbine 34, or used to generate power or run environmental systems of the aircraft such as the cabin cooling/heating system or the deicing system. In the context of a turbine engine, the hot portions of the engine are normally downstream of the combustor 30, especially the turbine section 32, with the HP turbine 34 being the hottest portion as it is directly downstream of the combustion section 28. Air that is drawn off the compressor and used for these purposes is known as bleed air.

Additionally, the ducts, or metal tubular elements thereof, can also be a fluid delivery system for routing a fluid through the engine 10, including through the duct assemblies 80. The duct assemblies 80, or other ducting assemblies leading either internally to other portions of the turbine engine 10 or externally of the turbine engine 10, can also include one or more metal tubular elements or metallic tubular elements forming ducts or conduits. It will be understood that the duct assemblies 80 can be positioned in any desired location within the engine 10.

Figure 2A:
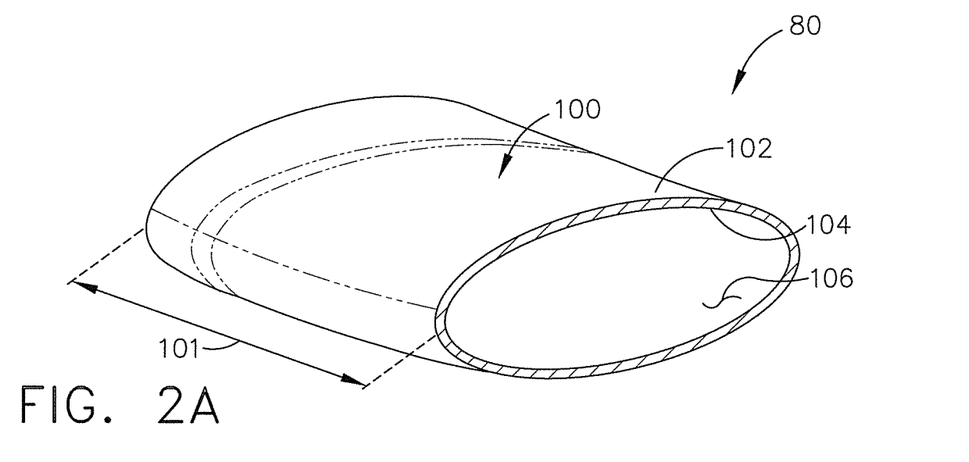
FIG. 2A illustrates a perspective view of a duct that can be utilized in the duct assembly of FIG. 1.

Turning to FIG. 2A, the duct assembly 80 can include a duct body 100, which can be made from any material suitable for the environment including metals, plastics, or composites, and can be formed by any desired method including additive manufacturing, casting, extruding, or formed tubing or sheets, in non-limiting examples. In an example where the duct body 100 is formed by additive manufacturing, it is also contemplated that the additive manufacturing process can include electroforming (also referred to herein as "electrodeposition"). Electroformed ducts may be particularly useful for tight engine spaces. Attachment features are required to enable attachment of the duct body 100 to surrounding structures. Historically p-clamps and saddle clamps have been used as the mate between duct and bracket, using attachment hardware for such structures increase the number of parts. Alternatively, sheet metal brackets were brazed to the duct surface, or machined components such as a flange were welded to the duct, in both cases exposing the duct to high heat causing material warpage. The duct assembly 80 as described herein and utilized in the engine 10 includes an electroformed bracket that eliminates piece part count at assembly, reduces stress risers associated with welds and controls warpages from high temperature braze cycles.

The duct body 100 can have a duct length 101 and include an exterior surface 102 and an interior surface 104. The exterior surface 102 is illustrated as being a curved exterior surface 102. It will be understood that any shape or profile can be utilized including flat, cylindrical, or otherwise. Either of the exterior or interior surfaces 102, 104 can also include surface features such as rough portions, protuberances, ribbing, etc. as desired. The interior surface 104 can form a fluid passageway 106 along the duct length 101 through which fluids, including bleed air, can move.

Figure 2B:
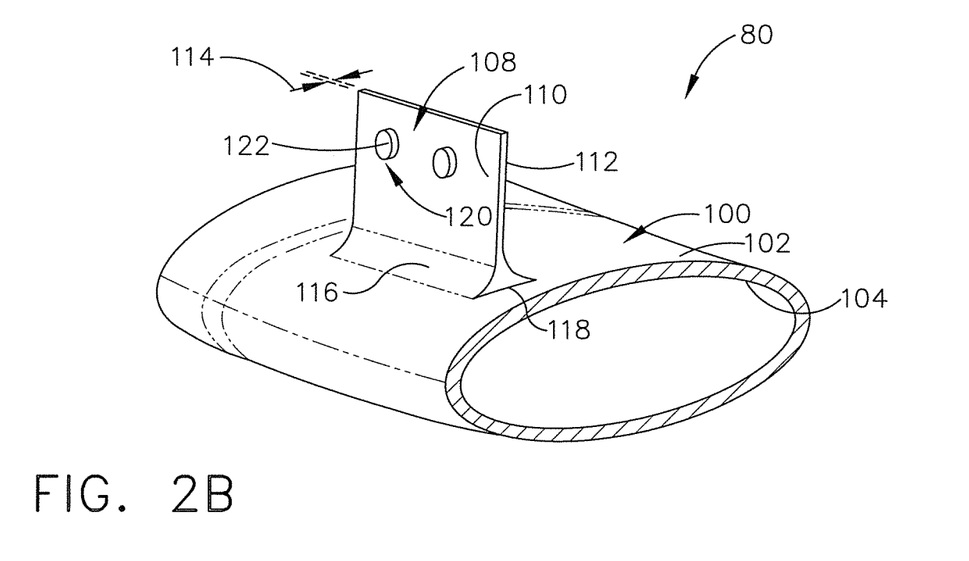
FIG. 2B illustrates a perspective view of the duct of FIG. 2A including an exemplary sacrificial mold.

FIG. 2B illustrates a sacrificial mold 108 disposed on the duct body 100. By way of non-limiting example, the sacrificial mold 108 can be placed, held, or otherwise attached on the exterior surface 102. The sacrificial mold 108 can be made from a variety of materials including, but not limited to, low-melting-temperature materials, waxes, polymers, plastics, or metals such as aluminum, and the materials can be in any desired configuration such as solid, hollow, or foam. The sacrificial mold 108 can include an exposed first outer surface 110 spaced from an exposed second outer surface 112. In this manner the mold 108 is illustrated as having a thickness 114 between the first and second outer surfaces 110, 112. In one non-limiting example the mold thickness 114 can be 1.3 cm or smaller; it should be understood that any mold thickness 114 can be utilized to form portions of the duct assembly 80.

A curved surface portion 116 is included on each of the first and second outer surfaces 110, 112, although this need not be the case. The curved surface portions 116 form a bottom surface 118 of the sacrificial mold 108. It is also contemplated that the bottom surface 118 of the mold 108 can have a consistent profile, curvature, or surface character that is consistent with the exterior surface 102 of the duct body 100. Furthermore, at least one projection 120 having a projection surface 122 can extend from one of the first or second outer surfaces 110, 112 as shown.

Figure 2C:
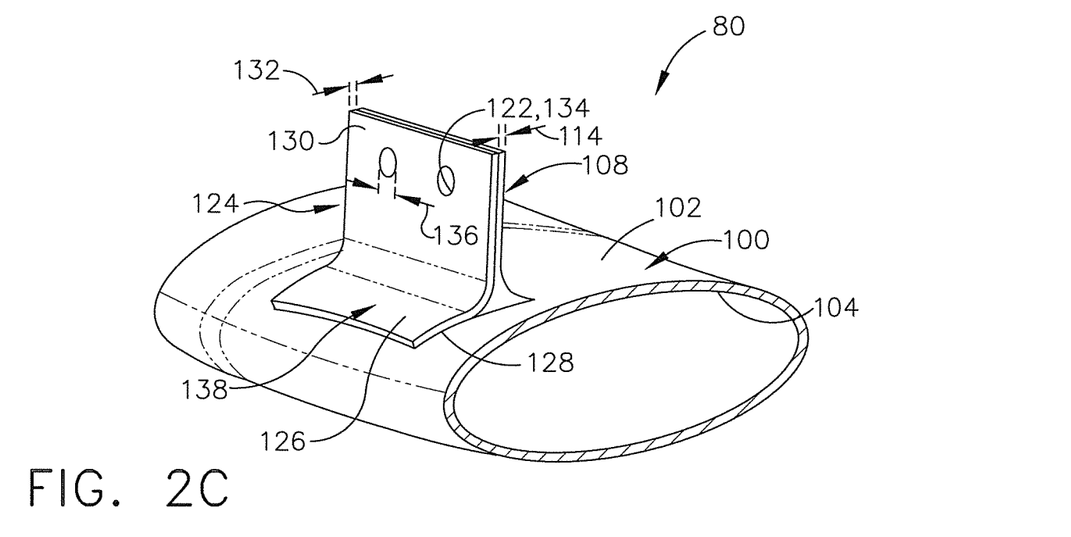
FIG. 2C illustrates a perspective view of the duct and mold of FIG. 2B including an attachment structure in the form of a bracket.

FIG. 2C illustrates the duct assembly 80 with an attachment structure 124 formed on the duct body 100. The attachment structure 124 can include, or be made from, a metallic layer 126 having an inner surface 128 formed over the exposed first outer surface 110 (FIG. 2B) of the mold 108 and at least a portion of the exterior surface 102 of the duct body 100. The metallic layer 126 can also have an outer surface 130 spaced from the inner surface 128.

It is contemplated that the metallic layer 126 can be electrodeposited onto the duct body 100. Non-limiting examples of materials that can be utilized in the metallic layer 126 include nickel, nickel alloy, copper, or other electroformable materials. The metallic layer 126 can further include a layer thickness 132; in one non-limiting example, the layer thickness 132 can be the same as the mold thickness 114, including 0.32 cm or smaller. The layer thickness 132 can also be greater than, or smaller than, the mold thickness 114 as desired.

In addition, the metallic layer 126 can include at least one aperture 134 surrounding the projection surface 122 and having an aperture width 136. It is contemplated that the projection surface 122 can be flush with, or extend beyond, the outer layer surface 130. In the example of FIG. 2C, the attachment structure 124 is illustrated in the form of a bracket 138 which can be unitarily formed with the curved exterior surface 102 of the duct body 100. The formation of the metallic layer 126 over the curved surface portion 116 allows the attachment structure 124 to be electroformed seamlessly to the duct body 100. The attachment structure 124 can be formed in nonconventional orientations, such as about a curved portion of the duct body 100, utilizing this method and without the use of loose hardware or secondary braze or weld. A footprint 127 of the attachment structure 124 can be defined as the structural joint attached to the duct body 100, as the metallic layer 126 is deposited directly onto the duct body 100.

Figure 2D:
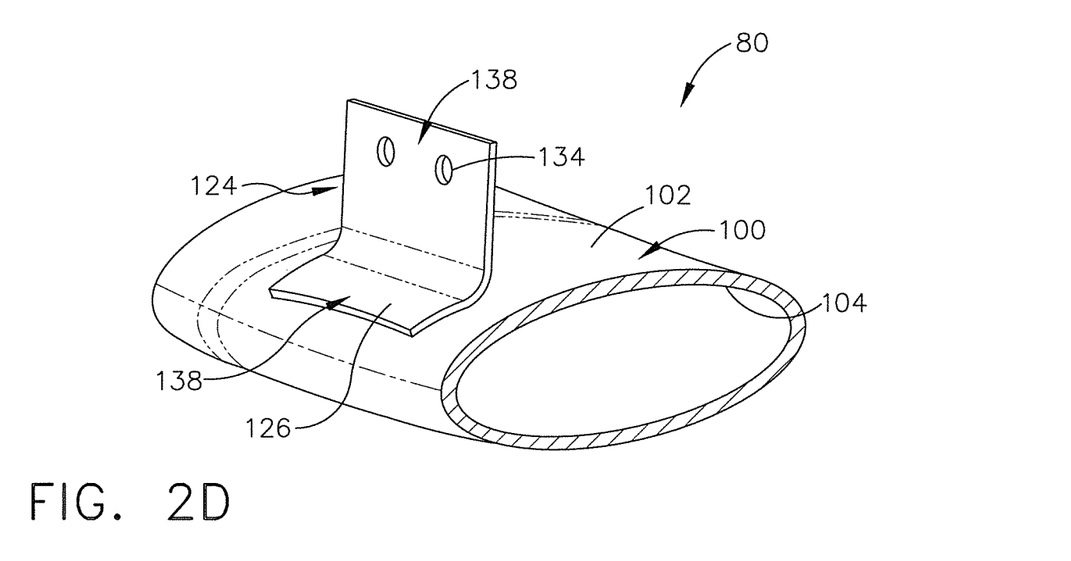
FIG. 2D illustrates a perspective view of the duct and bracket of FIG. 2C after removal of the sacrificial mold.

FIG. 2D illustrates the sacrificial mold 108 removed from the duct assembly 80. This can be done in any suitable manner, non-limiting examples of which include by melting, such as through application of heat to the mold 108, by dissolving, e.g. a chemical dissolving process, or by softening, e.g. application of sufficient heat to soften the mold 108 for mechanical removal. The attachment structure 124 can be utilized to attach to a portion of the engine 10 of FIG. 1. For example, it is contemplated that the bracket 138 can be configured to attach to a portion of the aircraft engine 10 or surrounding structures such as via the apertures 134. The duct body 100 can also be configured to attach to a portion of the engine 10 such as at its fluid inlet and outlet. In this manner, either or both of the bracket 138 or the duct body 100 in the duct assembly 80 can attach, mount, or be coupled to the engine 10 as desired.

Figure 3:
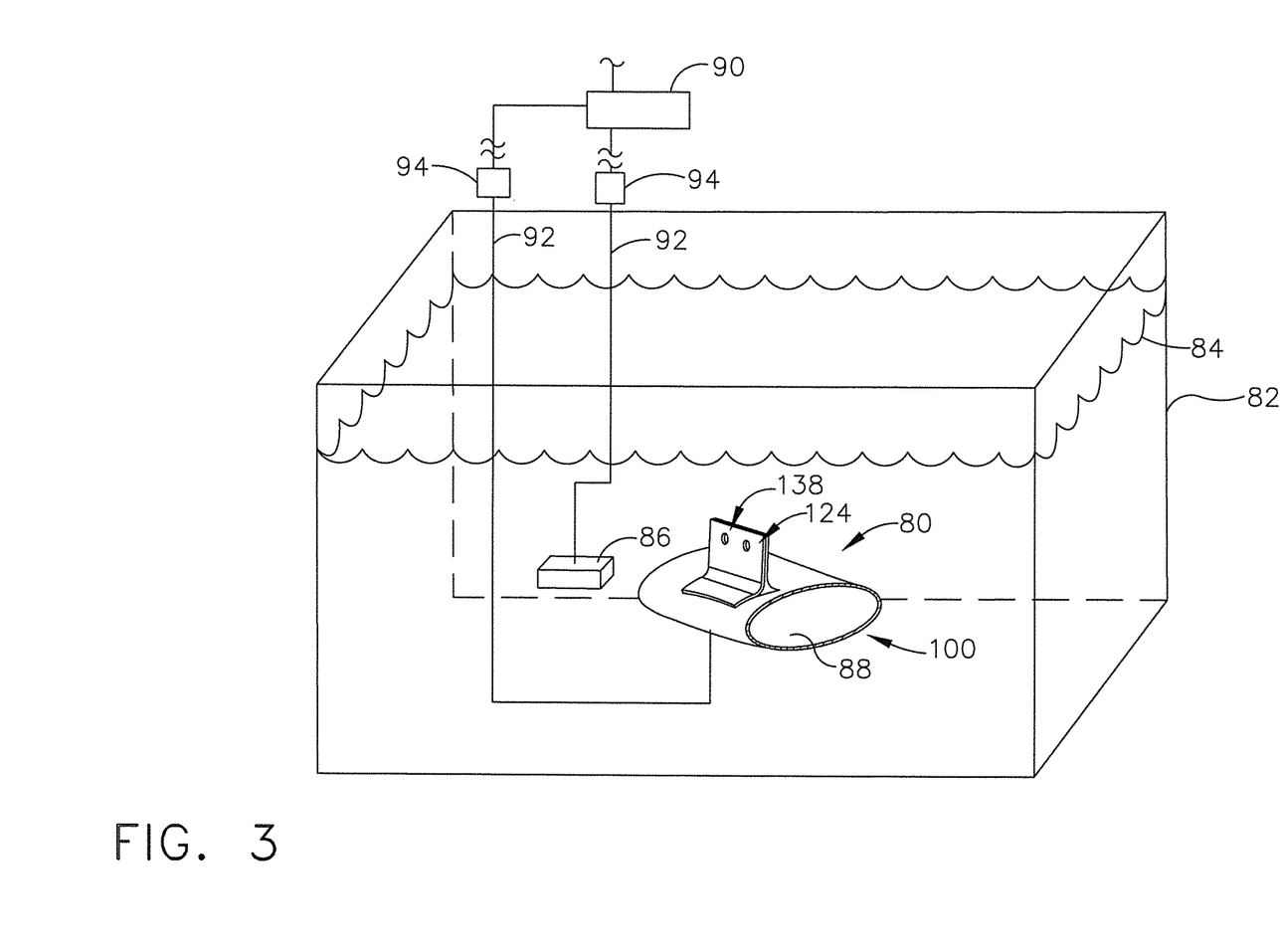
FIG. 3 schematically illustrates an electroforming bath for forming the attachment structure of FIG. 2C.

The electroforming process is illustrated by way of an electrodeposition bath in FIG. 3. An exemplary bath tank 82 carries a single metal constituent solution 84. The single metal constituent solution 84, in one non-limiting example, can include nickel alloy carrying alloying metal ions.

An anode 86 spaced from a cathode 88 is provided in the bath tank 82. The anodes 86 can be sacrificial anodes or an inert anode. While one anode is shown, it should be understood that the bath tank 82 can include any number of anodes 86 as desired. The duct assembly 80 can form the cathode 88, having electrically conductive material. It is also contemplated that a conductive spray or similar treatment can be provided to the duct assembly 80 to facilitate formation of the cathode 88. In addition, while illustrated as one cathode 88, it should be appreciated that one or more cathodes are contemplated for use in the bath tank 82.

A controller 90, which can include a power supply, can electrically couple to the anode 86 and the cathode 88 by electrical conduits 92 to form a circuit via the conductive metal constituent solution 84. Optionally, a switch 94 or sub-controller can be included along the electrical conduits 92, between the controller 90 and the anodes 86 and cathode 88. During operation, a current can be supplied from the anode 86 to the cathode 88 to electroform a monolithic body at the duct body 100. During supply of the current, nickel, nickel cobalt, and nickel alloys from the single metal constituent solution 84 form a metallic layer, such as the metallic layer 126 described in FIG. 2C, over the duct body 100 to form the attachment structure 124 such as the bracket 138.

Figure 4:
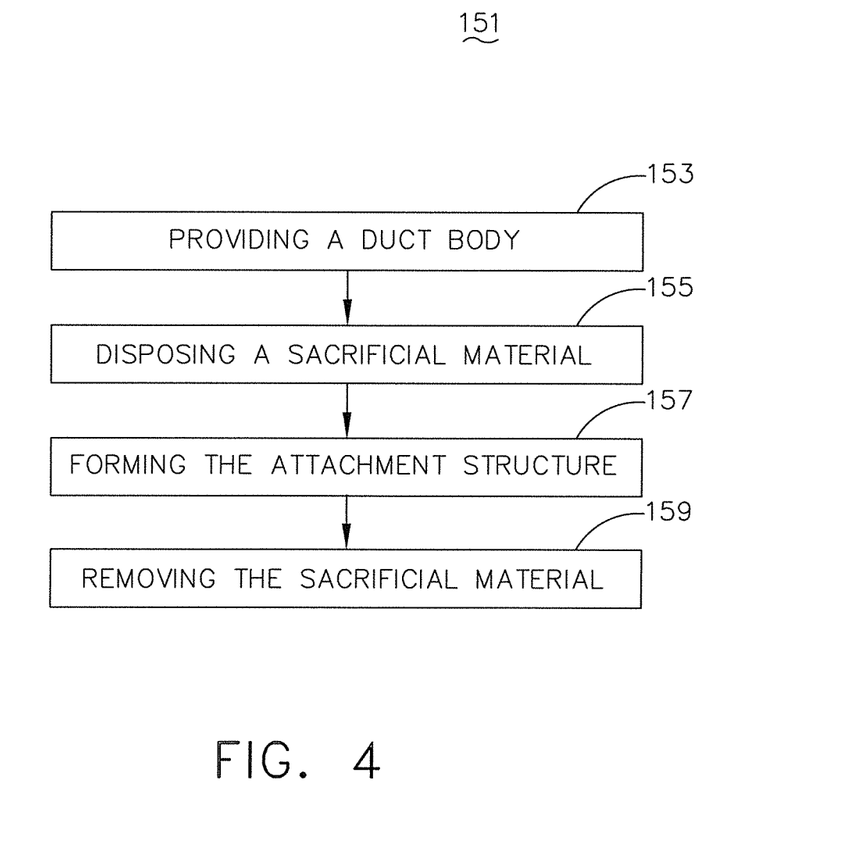
FIG. 4 is a flowchart diagram illustrating a method of forming the duct assembly of FIG. 2D.

FIG. 4 illustrates a method 151 of forming a strengthened component, such as the duct assembly 80. The duct body 100 can be provided at 153. Providing the duct body can include forming the duct body, which may be done by way of additive manufacturing or electrodeposition.

At 155, a sacrificial material, such as the sacrificial mold 108, can be disposed onto the duct body 100. As described in FIG. 2B, the sacrificial mold 108 can be formed from waxes, polymers, plastics, or metals, including solids or foams, and include at least one exposed outer surface 110. At 157 the attachment structure 124 can be formed by way of electroforming the metallic layer 126 over the exposed mold outer surface 110 and at least a portion of the exterior surface 102 of the duct body 100 as described in FIG. 2C. The electroforming can also include forming the metallic layer 126 having a varying thickness 132 over portions of the attachment structure 124. At 159 the sacrificial mold 108 can be removed from the duct body 100, including by way of melting via applied heat, softening with mechanical removal, or dissolving via chemical application as described in FIG. 2D.

Figure 5A:
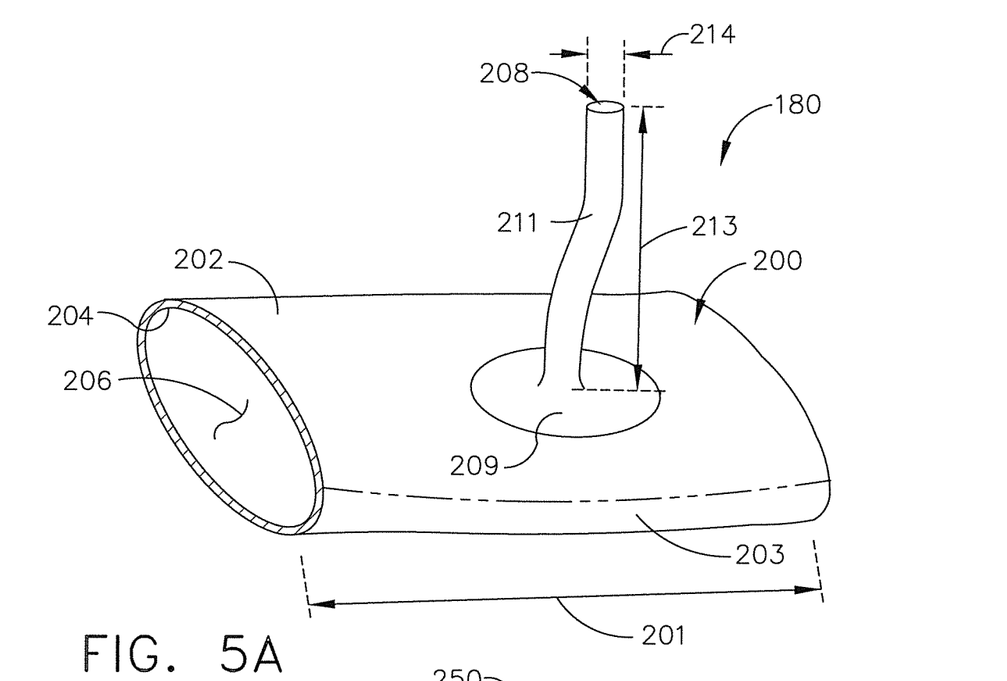
FIG. 5A illustrates a perspective view of another duct which can ultimately be utilized in the duct assembly of FIG. 1 having an exemplary sacrificial mold.

FIG. 5A illustrates another sacrificial mold on a duct body that can be utilized to form a duct assembly 180 that can be utilized in the engine 10. The duct assembly 180 is similar to the duct assembly 80; therefore, like parts will be identified with like numerals increased by 100, with it being understood that the description of the like parts of the duct assembly 80 will apply to the duct assembly 180, except where noted.

In FIG. 5A, the duct assembly 180 includes a duct body 200 having a length 201 and including an exterior surface 202 and interior surface 204, where the interior surface 204 can form or define a fluid passageway 206 as shown. The duct body 200 is illustrated as having an ovate cross-section with a region of greatest curvature 203 along the length 201 as shown.

A sacrificial mold 208 can be disposed on the exterior surface 202 of the duct body 200; in the example of FIG. 5A the sacrificial mold 208 can be formed with a mold base 209 adjacent the duct body 200. A mold arm 211 having a mold length 213 and mold thickness 214 can extend from the mold base 209 as shown. In a non-limiting example, the mold thickness 214 at the arm 211 can be 1.3 cm or smaller. Furthermore, the mold arm 211 can have any desired shape or profile, and is illustrated as essentially cylindrical with a curvilinear/irregular profile.

Figure 5B:
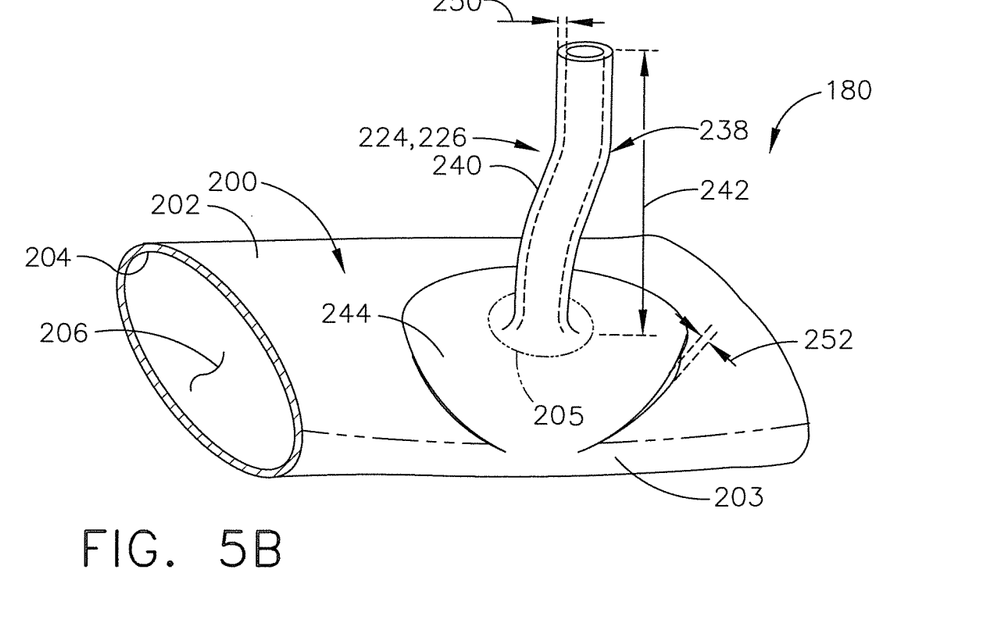
FIG. 5B illustrates a perspective view of the duct of FIG. 5A including another attachment structure in the form of a coupling arm.

An attachment structure 224 can be electroformed as a metallic layer 226 over the sacrificial mold 208 as well as the region of greatest curvature 203, as shown in FIG. 5B. The attachment structure 224 is illustrated in the form of a coupling arm 238 having an arm 240 with a length 242 and extending from a base 244. The coupling arm 238 can be curvilinear, straight, or have an irregular or asymmetric profile. In one example the coupling arm 240 can be used to couple the duct body 200 to another duct body within the engine 10. In another example, the coupling arm 238 can have a hollow interior in fluid communication with the fluid passageway 206. In such a case, the duct body 200 can include a duct aperture 205 extending between the exterior and interior surfaces 202, 204. The coupling arm 238 can be formed over the duct aperture 205 and used as a fluid branch from the fluid passageway 206. In still another example, the coupling arm 238 can have a solid interior, such as by filling after removal of the sacrificial mold 208.

It is further contemplated that the metallic layer 226 can have a variable layer thickness over portions of the attachment structure 224. In a non-limiting example, the arm 240 can have a first layer thickness 250 of 0.32 cm, while the base 244 can have a second layer thickness 252 of 0.15 cm. It should be understood that the first and second layer thicknesses 250, 252 can be any desired amount for use in the attachment structure 224. Furthermore, the first and second layer thicknesses 250, 252 can be of equal sizes in an example where the metallic layer 226 has a uniform layer thickness. In still another example, the arm 240 can have a variable layer thickness over the length 242.

FIG. 5B illustrates the duct assembly 180 after removal of the sacrificial mold 208. The base 244 of the coupling arm 238 is unitarily formed with the duct body 200, including over the region of greatest curvature 203 of the duct body 200. The arm 240 is illustrated as being hollow; it will be understood that the sacrificial mold 208 can also be shaped to form a solid arm 240 as desired. It is further contemplated that the coupling arm 238 can be configured to attach to a portion of the engine 10 or to another duct body 200 (not shown).

Figure 6A:
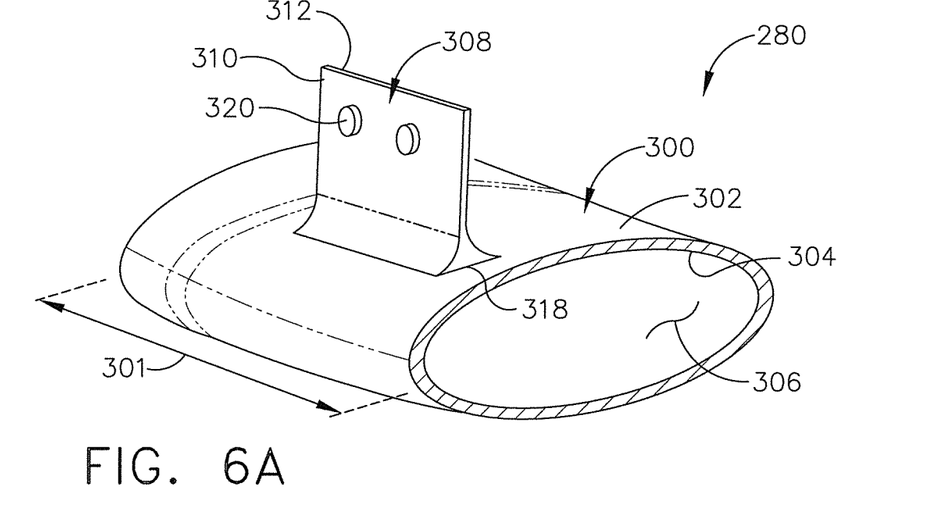
FIG. 6A illustrates a perspective view of another duct which can be utilized in the duct assembly of FIG. 1 having an exemplary sacrificial mold.
Figure 6B:
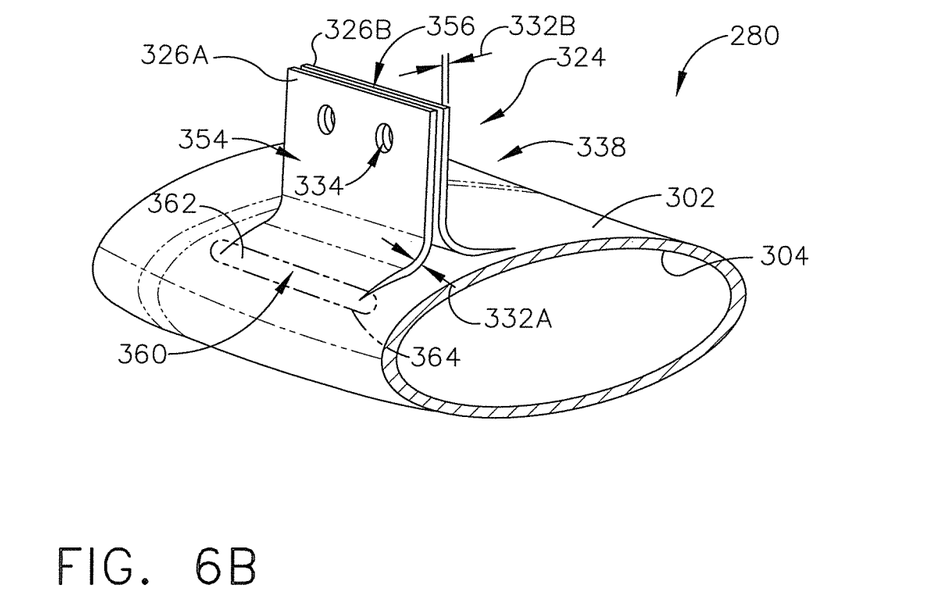
FIG. 6B illustrates a perspective view of the duct of FIG. 6A including another attachment structure in the form of a double-sided bracket.

FIGS. 6A and 6B illustrate another duct assembly 280 that can be utilized in the engine 10. The duct assembly 280 is similar to the duct assembly 80; therefore, like parts will be identified with like numerals increased by 200, with it being understood that the description of the like parts of the duct assembly 80 will apply to the duct assembly 280, except where noted.

In FIG. 6A, the duct assembly 280 includes a duct body 300 having a length 301 and including an exterior surface 302 and interior surface 304, where the interior surface 304 can form or define a fluid passageway 306 along the length 301 as shown. A sacrificial mold 308 similar to that described in FIG. 2B can be disposed on the exterior surface 302 of the duct body 300, where the sacrificial mold 308 includes exposed first and second outer surfaces 310, 312 spaced from one another, as well as a bottom surface 318 adjacent the exterior surface 302 of the duct body 300. Furthermore, the sacrificial mold 308 can also include projections 320 extending from each of the first and second outer surfaces 310, 312.

FIG. 6B illustrates the finished duct assembly 280 after removal of the sacrificial mold 308. An attachment structure 324 has been electroformed as separate first and second metallic layers 326A, 326B having respective first and second layer thicknesses 332A, 332B. The first metallic layer 332A formed over the exposed first outer surface 310 of the mold 308 (FIG. 6A) and the second metallic layer 332B formed over the exposed second outer surface 312 of the mold 308. Each of the first and second metallic layers 326A, 326B is formed over at least a portion of the exterior surface 302 of the duct body 300.

The attachment structure 324 formed is an exemplary two-piece bracket 338 with the first metallic layer 326A forming a first side 354 and the second metallic layer 326B forming a second side 356 spaced from the first side 354. Each of the first and second sides 354, 356 of the two-piece bracket 338 can include apertures 334. The apertures 334 can be formed from the projections 320 of the sacrificial mold 308 (FIG. 6A). It will be understood that the first and second sides 354, 356 of the two-piece bracket 338 can be spaced such that a cylindrical spacer may be placed at the apertures 334 to create a metallic contact between the first and second sides 354, 356. This can provide a stiffer compression surface compared to the attachment hardware, providing sustained torque used to attach the bracket 338 to a portion of the engine 10. In another non-limiting example, a cylindrical spacer can be provided as a part within the sacrificial mold 308 to create the metallic connection as described above.

In addition, the two-piece bracket 338 can include a transitional surface 360 providing a smooth transition between one of the first and second sides 354, 356 and the curved exterior surface 302 of the duct body 300. "Smooth transition" as used herein will refer to a layer thickness 332A, 332B decreasing toward zero in a direction toward a distal edge 362 of the attachment structure 324 proximate the duct body 300. Furthermore, the transitional surface 360 can have a portion 364 which is flush with the curved exterior surface 302. In this manner the two-piece bracket 338 can be electrodeposited anywhere on the exterior surface 302, and the transitional surface 360 can be utilized to seamlessly connect the two-piece bracket 338 to the duct body 300. It will be understood that the transitional surface 360 can also be utilized in any of the duct assemblies described in the present disclosure. The transitional surface or smooth transition can also be referred to in the art as a knife edge radius. The tapering of the body forming the first side 354 along the duct body 300 allows the attachment structure 324 to more seamlessly be formed with the duct body 300.

Figure 7A:
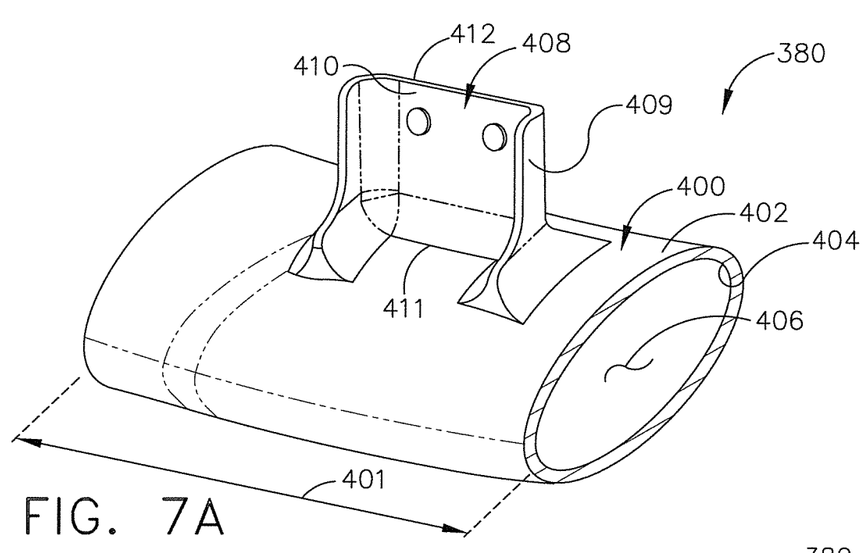
FIG. 7A illustrates a perspective view of another duct which can be utilized in the duct assembly of FIG. 1 having an exemplary sacrificial mold.
Figure 7B:
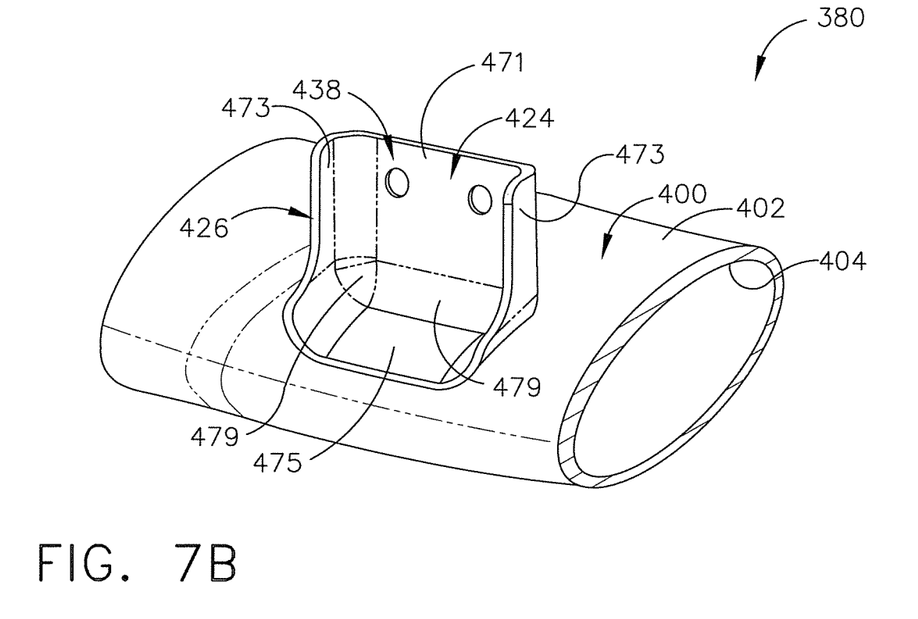
FIG. 7B illustrates a perspective view of the duct of FIG. 7A including another attachment structure in the form of a rounded bracket.

FIGS. 7A and 7B illustrate another duct assembly 380 that can be utilized in the engine 10. The duct assembly 380 is similar to the duct assembly 80; therefore, like parts will be identified with like numerals increased by 300, with it being understood that the description of the like parts of the duct assembly 80 will apply to the duct assembly 380, except where noted.

In FIG. 7A, the duct assembly 380 includes a duct body 400 having a length 401 and including an exterior surface 402 and interior surface 404, where the interior surface 404 can form or define a fluid passageway 406 along the length 401 as shown. A sacrificial mold 408 similar to that described in FIG. 2B can be disposed on the exterior surface 402 of the duct body 400, where the sacrificial mold 408 includes exposed first and second outer surfaces 410, 412 spaced from one another, as well as a bottom surface 418 adjacent the exterior surface 402 of the duct body 400. The sacrificial mold 408 can have a U-shaped profile with at least one mold wall 409 connecting to the bottom surface 418 via a mold seat 411 as shown. It will be understood that while illustrated with a U-shaped profile, the sacrificial mold 308 can have any desired profile including square, rectangular, round, or irregular.

FIG. 7B illustrates the finished duct assembly 380 after removal of the sacrificial mold 408. An attachment structure 424 can be electroformed as a metallic layer 426 over the exposed first surface 410 of the sacrificial mold 408. In the example of FIG. 7B the attachment structure 424 is in the form of a curved bracket 438 having a bracket main body 471 connected between bracket walls 473 and a bracket seat 475 adjacent the exterior surface 402 of the duct body 400 as shown. Curved portions 479 of the bracket 438 can connect the bracket walls 473 to the bracket main body 471 and bracket seat 475 as shown. In this manner the curved bracket 438 can be unitarily formed with the duct body 400. It is further contemplated that the curved portions 479 and bracket walls 473 provide for increased stiffness or strength of the curved bracket 438 during operation of the engine 10 (FIG. 1) as compared to brackets having no walls or curved portions, and that the curved bracket 438 can be utilized in environments with high applied stresses or forces.

Aspects of the present disclosure provide for a variety of benefits including that electroforming brackets eliminates the need to fabricate or install bracketry later. Electroforming brackets or other attachment structures unitarily with the ducts can reduce complexity in assembly and eliminates attachment hardware. Secondary brazing or welding operations, which often cause local surface warping, can also be eliminated. This in turn can reduce costs and increase the working lifetime of the duct assembly. It can be appreciated that the bracket being unitarily formed with the duct body can define or form a strengthened duct assembly which can be utilized in the engine, compared with traditional methods of coupling e.g. via brazing or welding.

In addition, attachment hardware can cause local increases in material stress along the duct, as the ducts shift or move in operation. It can be appreciated that unitarily forming the attachment structure with the duct can reduce these stresses and extend the lifetime of the duct assembly, further reducing costs. Furthermore, electroformed attachment structures do not slip, slide, or loosen from the duct body in operation compared to traditional attachment structures; this reduction in motion not only provides a more secure duct assembly, but it can also eliminate unnecessary active degrees of freedom and corresponding vibrational modes that can cause material fatigue.

It can be appreciated that the use of electrodeposition can provide for unconventional bracket shapes and positions, including coupling arms having varying widths, or positioning brackets over duct surfaces with high or irregular curvatures. It can be further appreciated that the increased customizability of attachment structure geometry and positioning can provide for better optimization of duct placement and organization within the engine. This is particularly advantageous in an aircraft environment where weight is directly tied to efficiency of the aircraft and fuel consumption.

To the extent not already described, the different features and structures of the various embodiments may be used in combination with each other as desired. That one feature may not be illustrated in all of the embodiments and is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of forming a strengthened component, the method comprising:
   providing a duct body having an exterior surface and an interior surface forming a fluid passageway;
   disposing a sacrificial mold having an exposed mold outer surface onto the duct body;
   forming an attachment structure by way of electroforming a metallic layer over the exposed mold outer surface and at least a portion of the exterior surface of the duct body; and
   removing the sacrificial mold.

2. The method of claim 1 wherein providing the duct body comprises forming the duct body via additive manufacturing.

3. The method of claim 2 wherein the additive manufacturing includes electroforming.

4. The method of claim 1 wherein the metallic layer has a thickness of 0.32 cm or smaller.

5. The method of claim 4 wherein the sacrificial mold has a thickness of 1.3 cm or smaller.

6. The method of claim 1 wherein the attachment structure is a bracket.

7. The method of claim 6 wherein the exposed mold outer surface comprises two spaced outer surfaces, and the electroforming a metallic layer comprises forming a separate metallic layer over each of the two spaced outer surfaces.

8. The method of claim 6 wherein the bracket is configured to mount the duct body to a portion of an aircraft engine.

9. The method of claim 1 wherein the electroforming the metallic layer includes forming a layer having a varying thickness over portions of the attachment structure.

10. The method of claim 9 wherein the attachment structure includes a transitional surface having a portion flush with the exterior surface of the duct body.

11. The method of claim 1 wherein removing the sacrificial mold includes at least one of melting or dissolving the sacrificial mold.

12. The method of claim 1 wherein the attachment structure is a coupling arm extending from a base.

13. The method of claim 12 wherein the coupling arm has a hollow interior in fluid communication with the fluid passageway.

14. The method of claim 1 further comprising forming at least one aperture in the attachment structure.

15. The method of claim 1 wherein the forming the attachment structure further comprises forming a curvilinear attachment structure.

* * * * *